US005630499A

United States Patent [19]
Louden et al.

[11] Patent Number: 5,630,499
[45] Date of Patent: May 20, 1997

[54] METHOD AND APPARATUS FOR RELEASABLY FASTENING A BAR-LIKE MEMBER TO A CONVEYOR BELT

[75] Inventors: Samuel J. Louden; John T. Hayes, both of Moorestown, N.J.

[73] Assignee: Ackley Machine Corporation, Moorestown, N.J.

[21] Appl. No.: 573,375

[22] Filed: Dec. 15, 1995

[51] Int. Cl.$^6$ ................................................ B65G 29/00
[52] U.S. Cl. ............................... 198/803.01; 198/803.14; 198/465.1
[58] Field of Search .................... 198/803.01, 803.14, 198/803.15, 465.1

[56] References Cited

U.S. PATENT DOCUMENTS

| | | | |
|---|---|---|---|
| 2,397,698 | 4/1946 | Sigler et al. | 198/803.14 X |
| 3,578,148 | 5/1971 | Pinckard | 198/803.01 |
| 3,819,194 | 6/1974 | Grevich et al. | 198/803.15 X |
| 3,884,143 | 5/1975 | Ackley | 198/803.01 X |
| 4,930,619 | 6/1990 | Fischer et al. | 198/803.01 X |
| 4,930,620 | 6/1990 | Springman | 198/803.01 |
| 5,297,671 | 3/1994 | Ruth | 198/465.1 X |

*Primary Examiner*—James R. Bidwell
*Attorney, Agent, or Firm*—Oliff & Berridge

[57] ABSTRACT

An article conveying system includes a conveyor belt including a plurality of carrier bars, a drive mechanism for driving the conveyor belt and a quick-release pin for releasably fastening the carrier bars to the drive mechanism. The quick-release pin includes an upper body portion, an upper body portion recess formed in the upper body portion and a flexible member positioned within the upper body portion recess. The flexible member has a compressed diameter (or dimension) no greater than a diameter of the upper body portion and an uncompressed diameter greater than the diameter of the upper body portion. The conveying system may also include a carrier hold down member that cooperates with a retractable roll capable of urging the carrier bar away from the quick-release pin. Furthermore, a method for releasably attaching the carrier bar and the quick-release pin includes guiding the quick-release pin into a blind or through hole of the carrier bar and sliding the quick-release pin along the hole until the flexible member mates with a recess of the carrier bar.

34 Claims, 8 Drawing Sheets

METHOD AND APPARATUS FOR RELEASABLY FASTENING A BAR-LIKE MEMBER TO A CONVEYOR BELT

BACKGROUND OF THE INVENTION

This invention relates to an article conveyor that includes a plurality of carrier bars attached to a rotating conveyor belt. In particular, this invention relates to a quick-release pin for releasably fastening the carrier bars to the conveyor belt. Furthermore, this invention relates to a method for releasably fastening a bar-like member to a quick-release pin having a flexible member.

Figure 1:
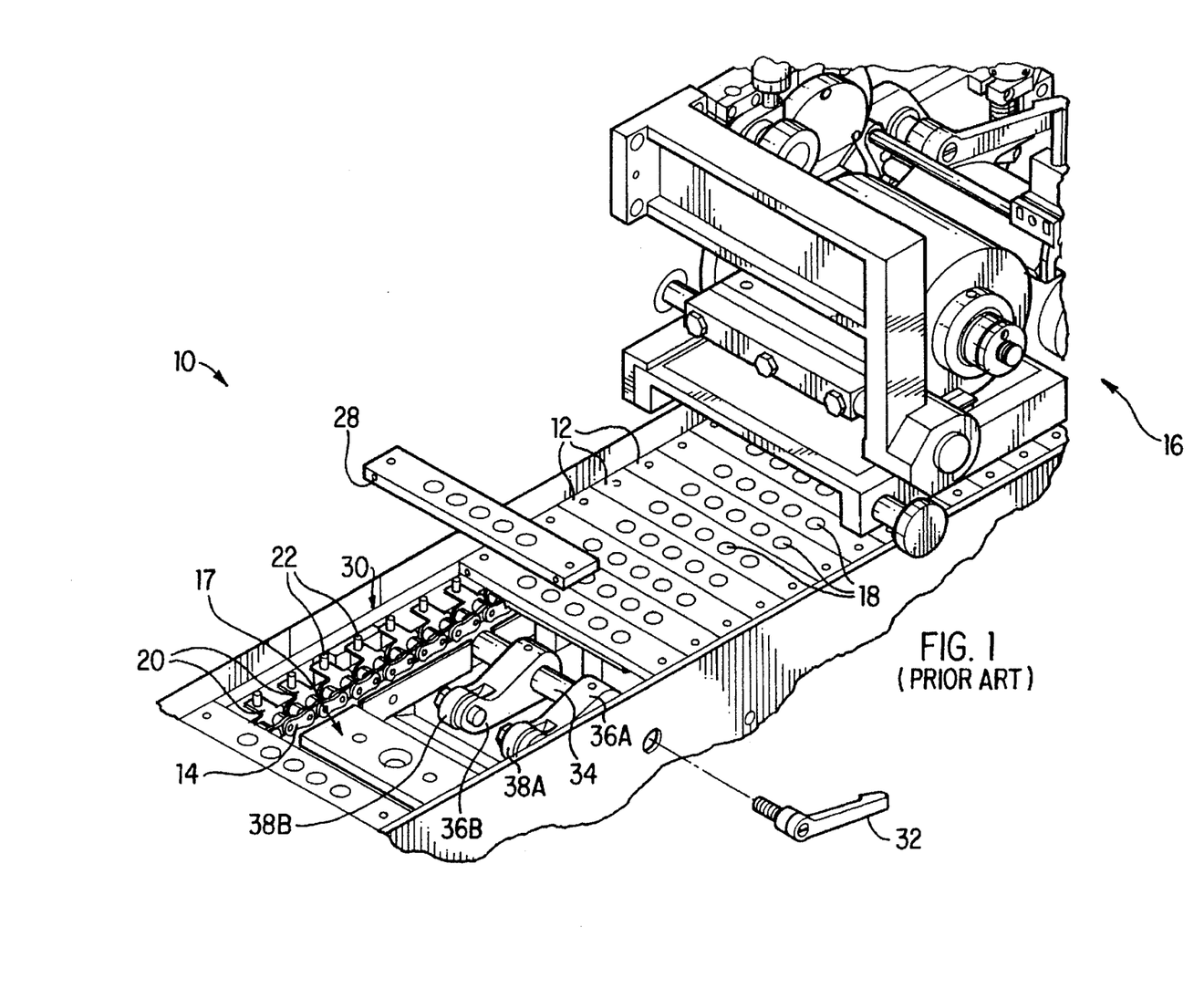
FIG. 1 is an isometric schematic view of a conventional article conveying apparatus.

FIG. 1 discloses a prior art conveying mechanism 10 having a plurality of carrier bars 12. The plurality of carrier bars are mounted on a rotatable chain 14 that is powered by an independent powering mechanism (not shown). The conveyor bars are guided through a printing assembly 16 that prints indicia on individual articles that are contained in carrier bar pockets 18 located on each of the carrier bars. The articles are vibrated by a vibrator 17 to promote proper positioning.

In operation, the carrier bars often require removal for repair, replacement or cleaning as a result of ink spillage in station 16.

One solution to cleaning or repairing each of the carrier bars was to detach each of the carrier bars from the rotatable chain 14, by unscrewing clamping members, such as screws or bolts, from support platforms 20 of each of the carrier bars 12. However, this operation was very time consuming and inefficient.

Figure 1A:
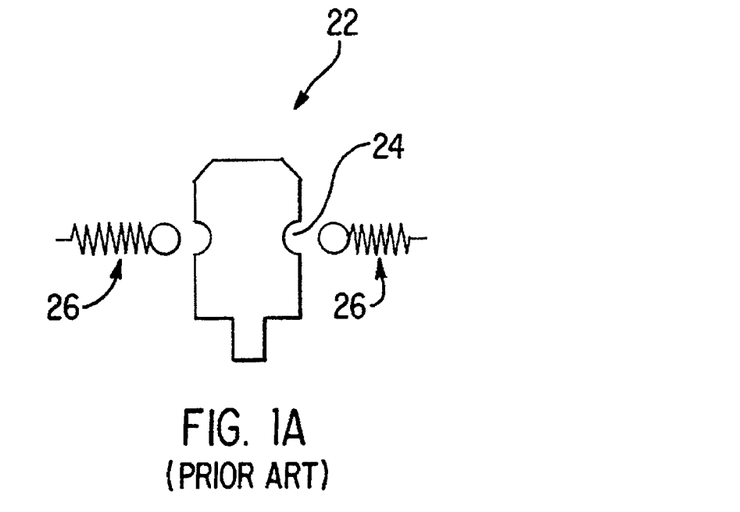
FIGS. 1A and 1B are detail views of fastening pins according to conventional methods.

According to FIG. 1, the carrier bars 12 are mounted onto the support platforms 20 using a pin 22, details of which are shown in FIG. 1A. Each pin 22 includes a centrally located groove 24 that is intended to cooperate with a pair of spring loaded ball bearings 26 located within the carrier bar on opposite sides from each other along groove 24. Each of the spring loaded ball bearings 26 is mounted in a threaded hole 28 of each of carrier bar. Accordingly, such a construction requires detailed machining of threaded holes 28 in order to positively lock the spring loaded ball bearings 26 into the groove 24.

Figure 1B:
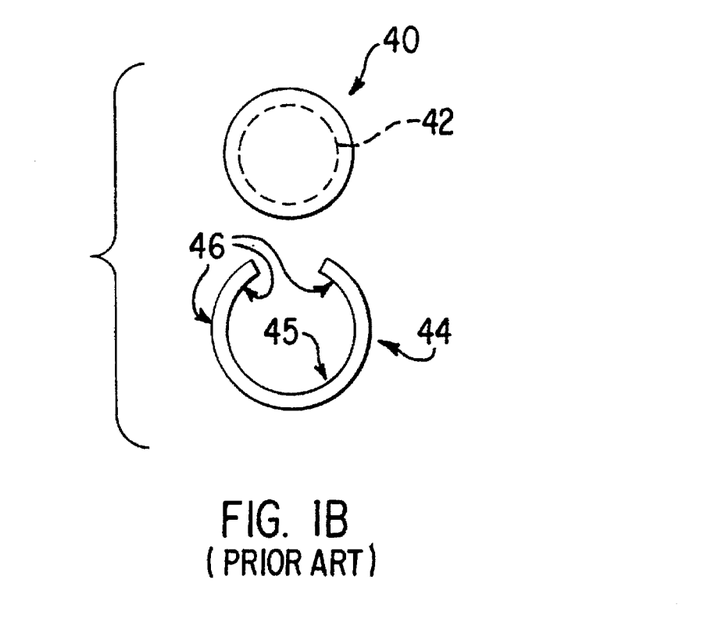

FIG. 1B illustrates yet another prior art attempt to facilitate the removal of carrier bars. A pin member 40, similar in construction to the pin 22, includes a groove 42 for receiving a c-clip 44. The c-clip 44 is made from a rigid material and is difficult to bend to fit inside the groove 42. Furthermore, the inner diameter 45 and open ends of the c-clip include sharp edges 46 that scrape against the pin 40 and the carrier bar holes, thus increasing friction and causing difficulties in removing/installing the carrier bar onto the pin and c-clip arrangement. Moreover, the scraping action creates metal shavings, which are particularly undesirable when the conveyor is used for transporting editable articles or pharmaceuticals, which requires adherence to stringent governmental regulations.

In operation, with either the ball bearings 26 or the c-c-clip 44, a selected carrier bar of the plurality of carrier bars 12 is aligned with an alignment arrow 30 along the side of the conveying system. When the selected carrier bar is centered on the alignment arrow 30, an actuation lever 32 is rotated to cause a shaft 34 located below the surface of the conveying belt to rotate. Rotation of the shaft 34 pivots arms 36A and 36B, each of which is fixedly mounted to the shaft 34. Each of the arms includes a freely rotating roller 38A and 38B that contacts the selected carrier bar and applies a force sufficient to oppose the force of the c-clip 44 or the spring loaded ball bearings 26, thus causing the ball bearing or c-clip to retract within the groove and allowing removal of the selected carrier bar. This arrangement has the drawback that a significant force is required for removing the carrier bar because the uneven frictional resistance of the c-clips causes the carrier bar to be canted during removal, thus making the removal process difficult.

SUMMARY OF THE INVENTION

It is an object of the present invention to overcome the shortcomings of the prior art by providing a quick-release pin that requires minimal machining of each of the carrier bars.

It is another object of the invention to provide a quick-release mechanism in which carrier bars can be uniformly snap-fitted into place and removed for repair, replacement or cleaning.

According to a first aspect of the invention, there is provided an article conveying system comprising a conveyor belt including a plurality of carrier bars, a drive mechanism for driving the conveyor belt, and a quick-release pin for releasably fastening the carrier bars to the drive mechanism. The quick-release pin includes an upper body portion defining longitudinal and transverse directions, an upper body portion recess formed in and surrounding a periphery of the upper body portion, and a flexible member positioned within and surrounding the periphery of the upper body portion recess. The flexible member has a compressed transverse dimension no greater than a transverse dimension of the upper body portion and an uncompressed transverse dimension greater than the transverse dimension of the upper body portion.

According to advantageous aspects of the invention, the flexible member may include a spring member such as a continuous helical spring member. In addition, the upper body portion may include a head portion that has a top recess that is cooperable with a pin tightening device. Each of the carrier bars may include a bore having a diameter substantially matching a diameter of the upper body portion of the quick-release pin, and the bore may include a central recess having a diameter matching an uncompressed diameter of the flexible member. The bore may be a blind bore or a through bore.

In addition, the article conveying system may include an ejection device for removing a selected carrier bar from the conveyor belt. The ejection device may include a recessed roll disposed below the conveyor belt with the recessed roll being engaged along its entire axial length with the bottom surface of the selected carrier bar.

The article conveying system may also include an alignment device for aligning the ejector device with the selected carrier bar. The alignment device may include an alignment indicator or a carrier bar hold down block arranged adjacent the conveyor belt. The hold down block may include a window having a width equal to a width of the selected carrier bar, and the window is registered with the ejection device during removal operation.

According to a second aspect of the invention, there is provided an article conveying system comprising a conveyor belt including a plurality of carrier bars, a drive mechanism for driving the conveyor belt, and a quick-release device including a substantially continuous and non-abrasive flexible member cooperable with the carrier bars. The quick-release device is structured to releasably snap the carrier bars onto the drive mechanism.

The quick-release device may include a quick-release pin that receives the flexible member, which is engageable with a recess of each of the carrier bars, and an ejection device may cooperate with the quick-release pin to disengage the flexible member from the recess.

According to a third aspect of the invention, there is provided a quick-release pin comprising an upper body portion defining longitudinal and transverse directions, an upper body portion recess formed in and surrounding a periphery of the upper body portion, and a flexible member positioned within and surrounding the periphery of the upper body recess. The flexible member has a compressed transverse dimension no greater than a transverse dimension of the upper body portion and an uncompressed transverse dimension greater than the transverse dimension of the upper body portion.

According to a fourth aspect of the invention, there is provided a method for releasably fastening a bar-like member to a quick-release pin having a flexible member disposed thereon and surrounding a periphery of the quick-release pin, the bar-like member including at least one bar hole defining a sidewall, the sidewall having a recess surrounding a periphery of the sidewall and cooperable with the flexible member. The method includes guiding the quick-release pin into the bar hole while resiliently compressing the flexible member, sliding the quick-release pin along the bar hole until the flexible member mates with the recess and allowing a transverse dimension of the flexible member to resiliently expand and substantially fill the recess when the flexible member mates with the recess to create a positive lock. The bar-like member may be removed from the quick-release pin by compressing the flexible member to eliminate the positive lock.

These and other advantages of the present invention will be described in or apparent from the following description of preferred embodiments.

BRIEF DESCRIPTION OF THE DRAWINGS

Preferred embodiments of the invention will be described in conjunction with the following drawings, in which.

DETAILED DESCRIPTION OF PREFERRED EMBODIMENTS

Preferred embodiments of the invention will be described in conjunction with FIGS. 2–9.

Figure 2:
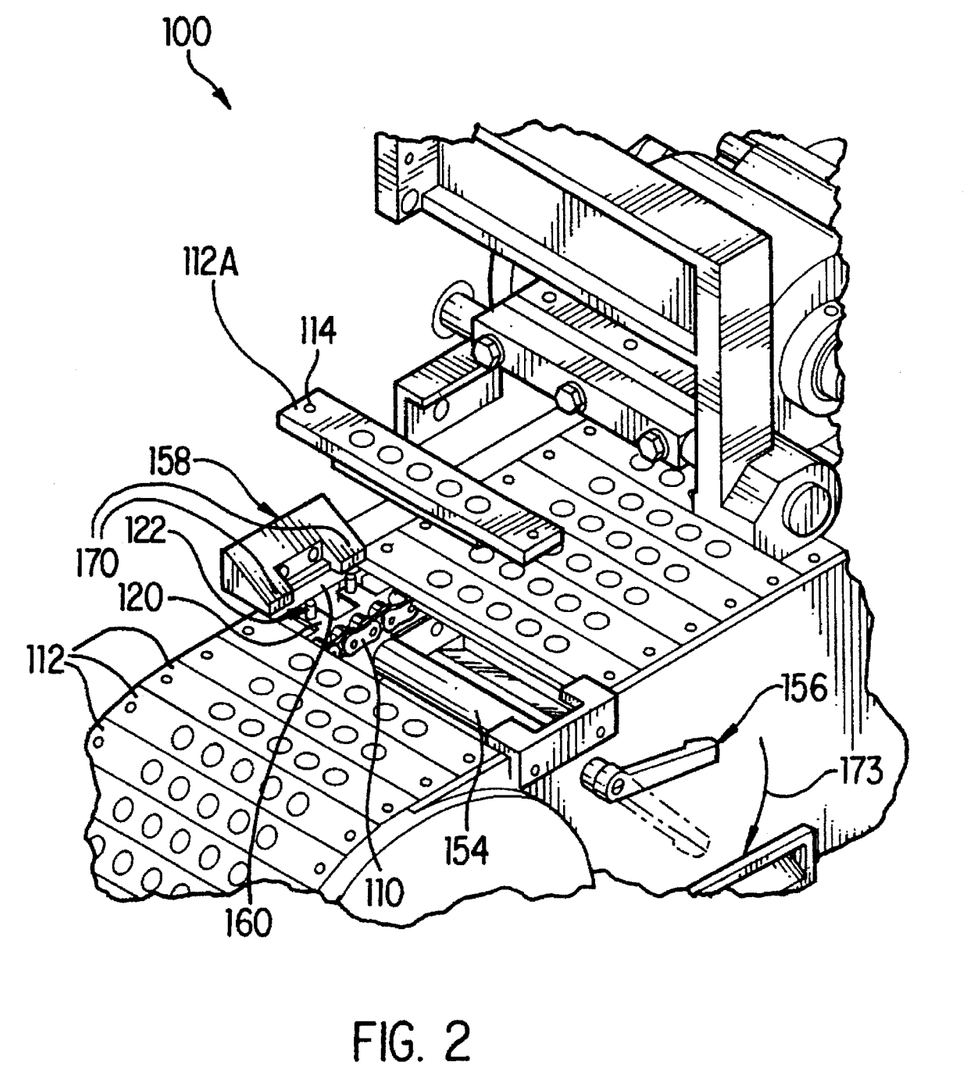
FIG. 2 is a schematic perspective view of a conveying system according to the present invention.

With reference to FIG. 2, an article conveying system 100 according to the present invention is shown. The article conveying system 100 includes a plurality of carrier bars 112. Each of the carrier bars 112 is releasably mounted to a conveyor belt that includes a chain 110. The chain 110 includes a corresponding mounting platform 120 for each of the carrier bars 112. Each mounting platform 120 includes a quick-release pin 122 for releasably mounting each of the carrier bars 112 thereto.

Figure 3:
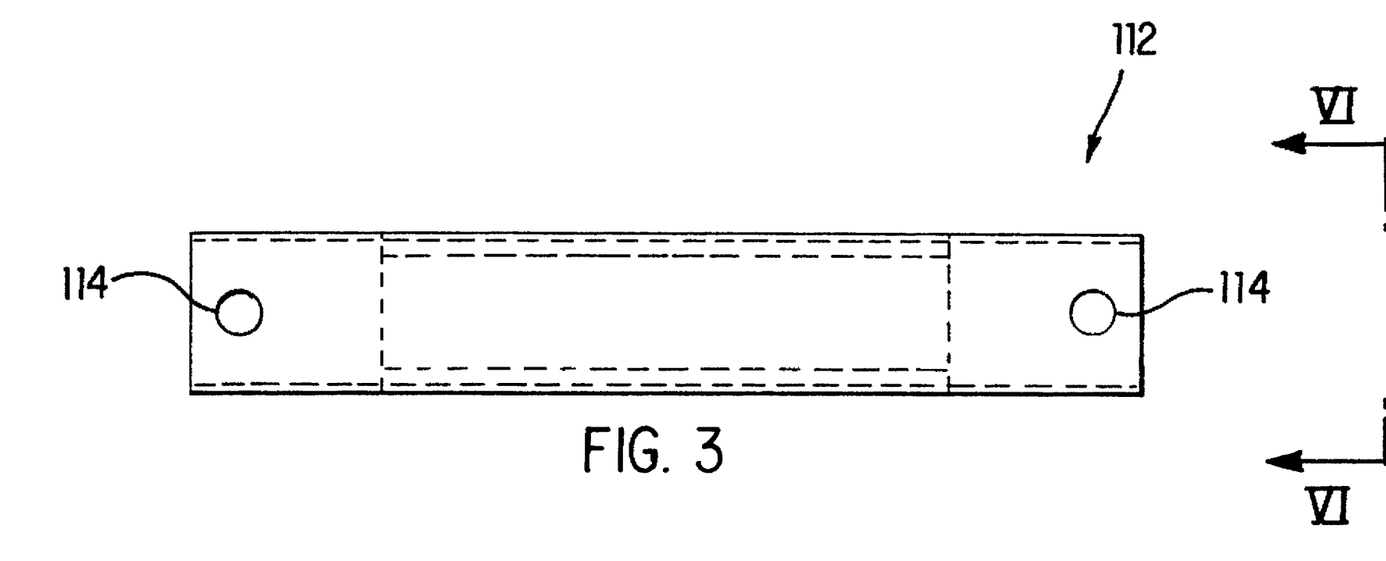
FIG. 3 is a plan view of a carrier bar according to the present invention.
Figure 3A:
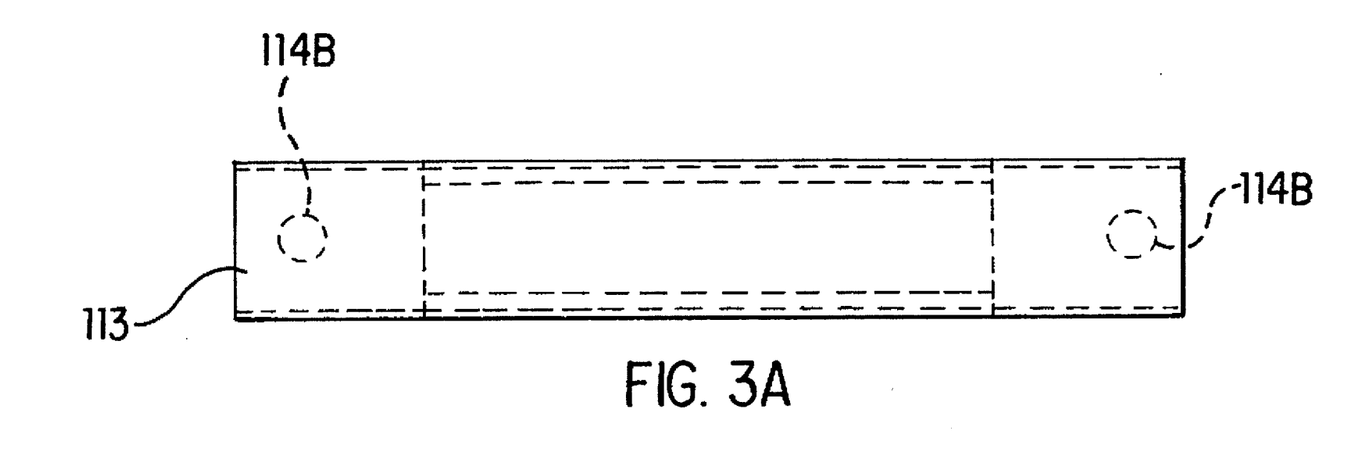
FIG. 3A is a plan view of a second embodiment of a carrier bar according to the present invention.
Figure 4:
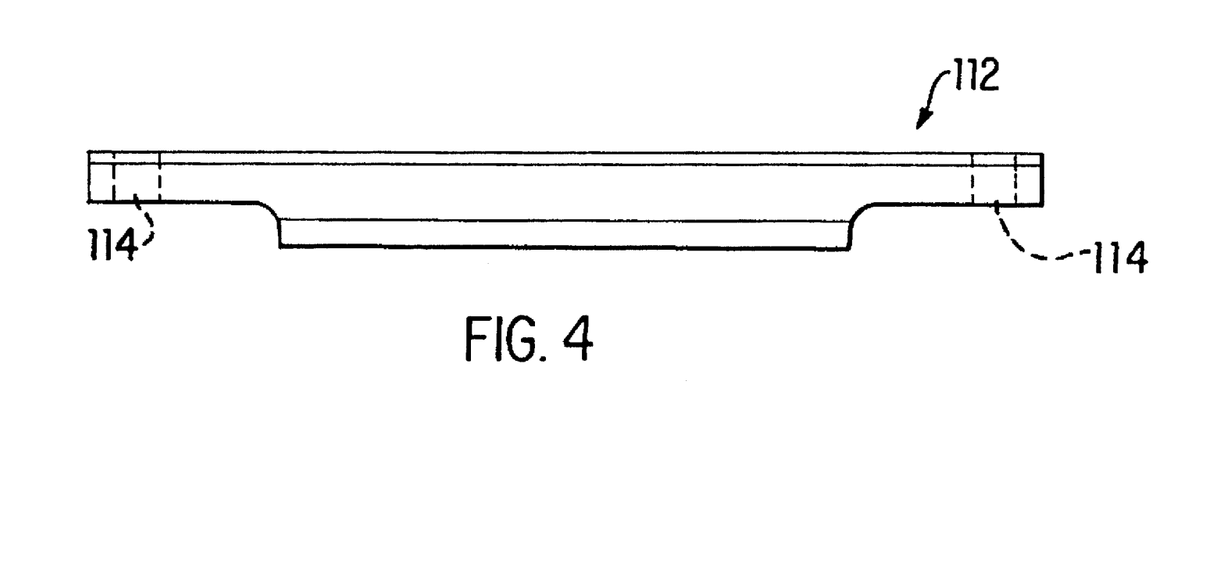
FIG. 4 is a side elevation view of the carrier bar shown in FIG. 3.
Figure 4A:
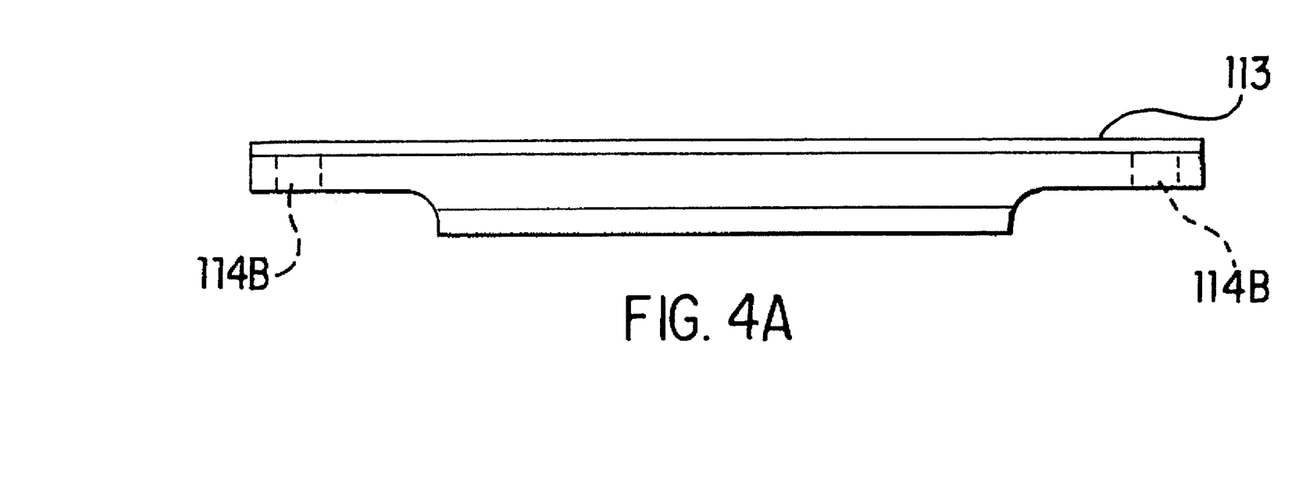
FIG. 4A is a side elevation view of the carrier bar shown in FIG. 3A.

As shown in FIG. 3, each carrier bar 112 has a generally rectangular cross section. The carrier bar shown in FIG. 3 includes a bore 114 located at each end of the carrier bar 112. Although in FIGS. 3 and 4 the bore 114 is shown to be a through bore, which may reduce the weight of each of the carrier bars, the bore could also be a blind bore (FIGS. 3A and 4A) such that the top surface 113 of each of the carrier bars is smooth, thus serving to prevent ink from flowing into the blind bore 114B. The blind bore 114B is particularly advantageous in the pharmaceutical industry because cleaning of the top surface 113 of each of the carrier bars does not entail seepage of cleaning material or ink into the internal portions of the carrier bars, thus providing a more sanitary environment.

Figure 6:
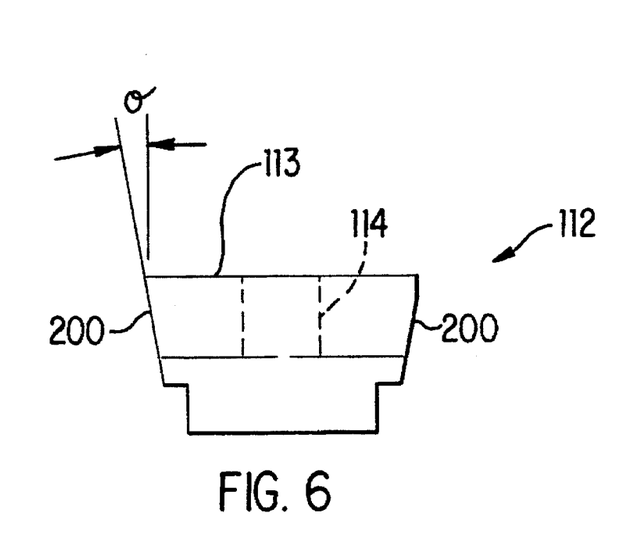
FIG. 6 is a side view of the carrier bar shown in FIG. 3.

FIG. 6 shows a side elevation view of the carrier bar 112 of FIG. 3. In FIG. 6, the carrier bar includes inclined side surfaces 200 that are disposed at an angle σ (sigma) of about 5°–15°. The inclined side surfaces allow the distance between adjacent carrier bars to vary as the conveyor is guided between curved portions and straight portions of the conveyor path.

Figure 5:
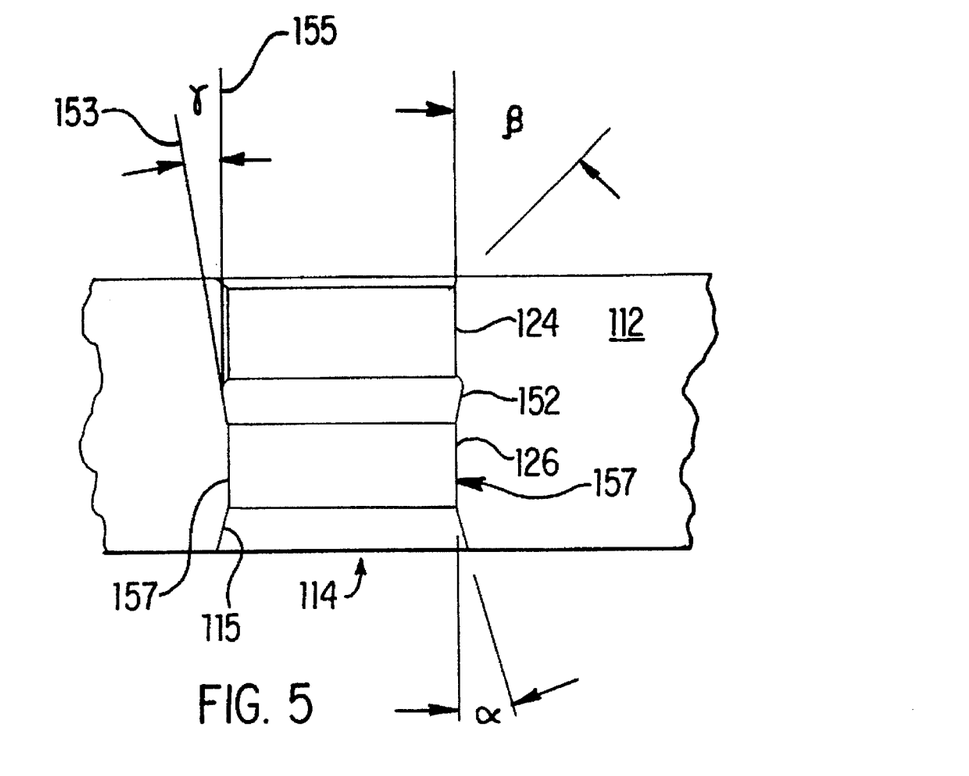
FIG. 5 is a detail view of one carrier bar hole of a carrier bar according to the present invention.

As shown in FIG. 5, each bore, whether a blind bore or a through bore, includes at least one central recess 152 that is disposed between an upper diameter portion 124 and a lower diameter portion 126, each of which is smaller in diameter than the central recess 152. The lower diameter portion 126 may also include an auxiliary recess 157 that serves as a safeguard in the event the carrier bar 112 for some reason begins to dislodge from the pin 122, as explained below.

Each bore 114 of each carrier bar is intended to cooperate with a quick-release pin according to the present invention.

Figure 7:
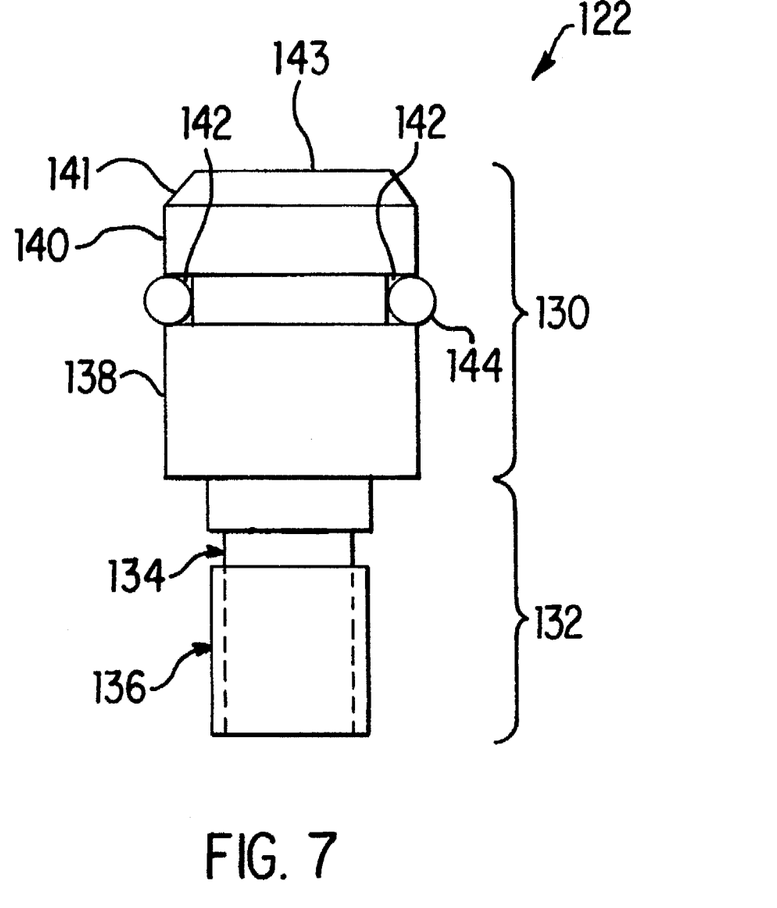
FIG. 7 is a detailed view of the quick-release pin according to the present invention.

As shown in FIG. 7, the quick-release pin 122 includes generally an upper body portion 130 and a lower body portion 132. The lower body portion includes a lower body recess 134 and a threaded portion 136 that is intended to cooperate with threads located on a respective mounting platform 120. The upper body portion 130 includes a main body 138 and a head portion 140. The main body 138 and the head portion 140 together sandwich an upper body portion recess 142. On the top surface 143, the head portion 140 may include a Phillips head, flat head or Allen wrench aperture for receiving a pin tightening device, and may also include a beveled edge 141.

Disposed within the upper body portion recess 142 is located a flexible annular member 144. The flexible member 144 may be any made from any type of flexible member material, but is shown in FIG. 7 as a continuous helical spring. The helical spring can be easily expanded to overcome the head portion 140 for insertion into the recess 142. The helical spring is a flexible member that has an uncompressed diameter that is greater than a diameter of both the head portion 140 and the main body 138.

Having now described the details of each of the quick-release pin 122 and the dimensions of each bore 114, their cooperation will now be described. The basic method includes guiding the quick-release pin 122 into the bore hole 114 and sliding the quick-release pin 122 along the bore hole 114 until the flexible member 144 mates with the central recess 152 of the bore hole 114. As the flexible member 144 slides along the lower diameter portion 126 of the bore hole 114, it assumes a compressed state having a compressed diameter that is substantially equal to the diameter of the lower diameter portion 126. Once the flexible member 144 reaches the central recess 152, the flexible member 144 expands to achieve a diameter that is equal to the diameter of the central recess 152. In addition, the upper diameter portion 124 mates with the head portion 140 of the quick-release pin 122, and the lower diameter portion 126 of the hole 114 mates with and matches the main body 138 of the quick-release pin 122. Finally, if a through bore is used, the top surface 143 of the pin 122 is flush with the top surface 113 of the carrier bar. Thus, the carrier bar is securely maintained on its respective quick-release pin, at each end of the carrier bar, until such time that it is desired to remove the carrier bar for replacement, cleaning, or repair.

The bores 114 and 114B may also include an insertion port 115 illustrated in FIG. 5. The insertion port 115 can be thought of as a truncated cone section that is inclined at an angle α (alpha), for example, between 12°–18°, and preferably 15°, with respect to a longitudinal axis of the bore. The insertion port 115 serves as a guiding portion that gradually compresses the diameter of the flexible member 144 as it is inserted into the bore 114, thus making the insertion process easier. The central recess 152 is dimensioned such that a line 153 that is tangent to the recess 152 makes an angle y (gamma), between 8°–12°, and preferably 10°, with respect to a line 155 that is parallel to the upper diameter portion 124. Furthermore, the bore 114 may be countersunk within the carrier bar 112 at an angle β (beta) between 40°–50°, and preferably 45°.

The auxiliary recess 157 (FIG. 5) provides a built-in safety measure against unintentional dislodging of the carrier bar 112 from the pin 122. In particular, if the flexible member 144 (FIG. 7) becomes dislodged from the recess 152 and slides along the lower diameter portion 126, the flexible member will enter the auxiliary recess 157, which serves to prevent total separation of the carrier bar 112 from the pin 122.

As shown in FIG. 2, the article conveying apparatus 100 also includes a recessed roll 154 that is located below a surface of the conveyor belt and carrier bars, so as not to interfere with such during conveying and printing operations. The recessed roll 154 is coupled to a quick-release lever 156 so that selected ones of the carrier bars can be urged away from and off of the carrier pins 122. To accomplish removal of a selected carrier bar 112A, the selected carrier bar is aligned with a carrier bar hold down block 158. The carrier bar hold down block includes a window 160 having a width that is at least equal to a width of each of the carrier bars. Once the selected carrier bar is aligned with the window 160, the quick-release lever 156 can be activated to urge the recessed roll 154 from its recessed position to its engagement position. The hold down block includes flank portions 170 that hold down carrier bars adjacent the selected carrier bar 112A during the removing operation.

Figure 8:
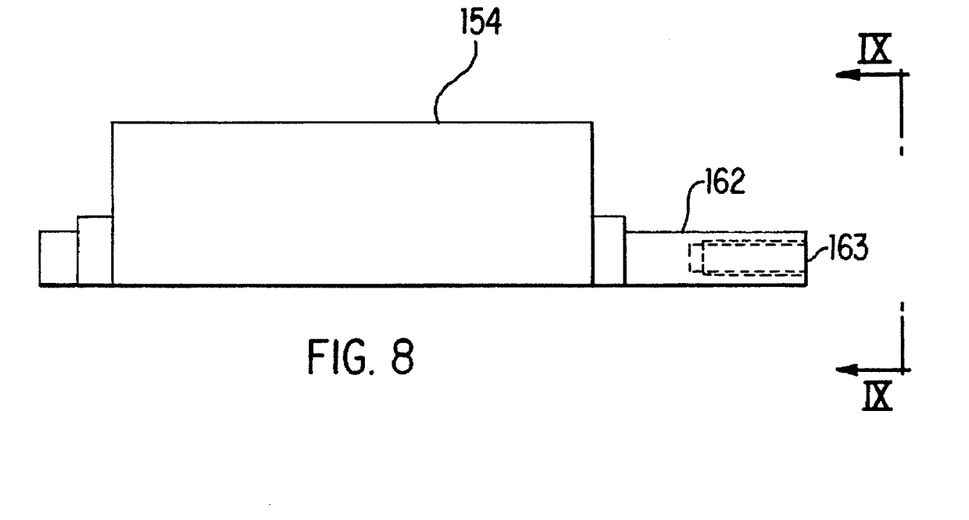
FIG. 8 is a side elevation view of a quick-release roll according to the present invention.
Figure 9:
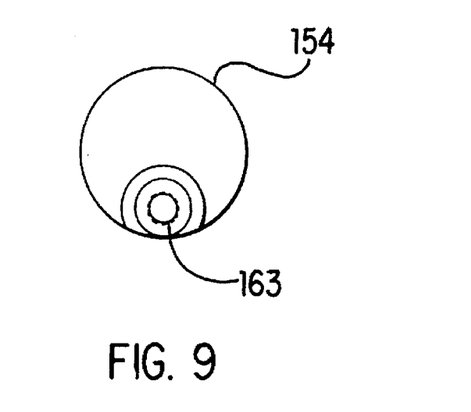
FIG. 9 is a side sectional view of the quick-release roll shown in FIG. 7.

As shown in FIGS. 8 and 9, an engagement shaft 162 is provided at a lower portion of the recessed roll 154. The shaft 162 includes a threaded portion 163 for receiving a corresponding threaded portion of the quick-release lever 156. Because the shaft 162 is mounted in an eccentric fashion with respect to the recessed roll 154, rotation of the quick-release lever in the direction of arrow 173 (FIG. 2) causes a camming action of the roll such that it raises from its recessed position to an engagement position to urge the selected carrier bar for removal. Upon the application of an adequate force, the flexible member 144 will be forced into its compressed shape so that the carrier bar can easily slide off of the quick-release pin 122.

As described above, the carrier bar can be easily snap fitted onto and from the quick-release pin. Because the non-abrasive flexible member, e.g. a helical or coil spring, engages the pin with smooth surfaces, no scraping action will occur and therefore no shavings will be created. Furthermore, detailed machining of the carrier bar is not required, such as is necessary for the spring loaded ball bearings 26 shown in FIG. 1A. Moreover, the continuous flexible member of the present invention is easily installed on the pin members and substantially fills the recess of the pin and the central recess of the bar hole to form a releasable positive lock.

The invention has been described in relation to pins and bores having a circular cross-section with the flexible member and recess being described as annular. However, other shapes are possible such as pins and bores with square or rectangular cross-sections and flexible members and recesses which surround the periphery of the pin and bore.

Furthermore, the invention has been described in conjunction with preferred embodiments thereof, which are intended to be illustrative, not limiting. Various modifications will be apparent to those of ordinary skill in the art without departing from the spirit and scope of the invention, as defined in the appended claims.

What is claimed is:

1. An article conveying system comprising:
 a conveyor belt including a plurality of carrier bars;
 a drive mechanism for driving said conveyor belt; and
 a quick-release pin for releasably fastening each of said carrier bars to said drive mechanism; said quick-release pin comprising:
  an upper body portion defining longitudinal and transverse directions;
  an upper body portion recess formed in and surrounding a periphery of said upper body portion, and
  a flexible member positioned within and surrounding the periphery of the upper body portion recess, said flexible member having a compressed transverse dimension no greater than a transverse dimension of the upper body portion and an uncompressed transverse dimension greater than the transverse dimension of the upper body portion.

2. The article conveying system of claim 1, wherein said quick-release pin further comprises a lower body portion connected to said upper body portion, said lower body portion including a threaded portion that mates with a corresponding threaded portion of said drive mechanism.

3. The article conveying system of claim 2, wherein said lower body portion includes a lower body recess.

4. The article conveying system of claim 1, wherein said flexible member includes a spring member.

5. The article conveying system of claim 4, wherein said spring member includes a continuous helical spring member.

6. The article conveying system of claim 1, wherein said upper body portion includes a head portion having a top recess that is cooperable with a pin tightening device.

7. The article conveying system of claim 6, wherein each of said carrier bars includes at least one hole having a first diameter, said at least one hole including at least one annular recess, and said upper body portion of said quick-release pin includes a head portion and a main body on each side of said upper body portion recess, each of said head portion and said main body having a second diameter substantially equal to said first diameter of the hole.

8. The article conveying system of claim 7, wherein a diameter of said annular recess of each of said carrier bars is substantially equal to the uncompressed transverse dimension of the flexible member.

9. The article conveying system of claim 1, wherein each of said carrier bars includes a bore having a diameter substantially matching a diameter of the upper body portion of the quick-release pin, said bore including an annular recess having a diameter matching an uncompressed diameter of the flexible member.

10. The article conveying system of claim 9, wherein said bore is a blind bore.

11. The article conveying system of claim 9, wherein said bore is a through bore.

12. The article conveying system of claim 1, wherein each of said carrier bars includes at least one hole cooperable with a corresponding quick release pin.

13. The article conveying system of claim 12, wherein said at least one hole is a blind bore on a first surface of the carrier bar facing the quick release pin, and said carrier bars each have a smooth second surface opposite the first surface.

14. The article conveying system of claim 12, wherein each bar includes a flared insertion port for gradually compressing the diameter of the flexible member as the quick release pin is received within the at least one hole.

15. The article conveying system of claim 1, further comprising a carrier bar ejection device for removing a selected carrier bar from the conveyor belt.

16. The article conveying system of claim 15, wherein said ejection device includes a recessed roll disposed below said conveyor belt in a recessed position, said recessed roll being movable from said recessed position to an extended position in which said roll contacts the selected carrier bar and the selected carrier bar is urged away from said quick-release pin.

17. The article conveying system of claim 16, wherein said recessed roll is eccentrically mounted about an axle of an ejector handle.

18. The article conveying system of claim 16, wherein an entire axial length of said recessed roll contacts said carrier bar in the extended position.

19. The article conveying system of claim 15, further comprising an alignment device for aligning the ejector device with the selected carrier bar.

20. The article conveying system of claim 19, wherein said alignment device includes an alignment indicator.

21. The article conveying system of claim 19, wherein said alignment device includes a carrier bar hold down block arranged adjacent the conveyor belt, the hold down block including a cutout portion having a width equal to a width of the selected carrier bar, the cutout portion being registered with the ejection device.

22. The article conveying system of claim 21, wherein said hold down block includes flank portions engageable with carrier bars adjacent the selected carrier bar.

23. The article conveying system of claim 1, further comprising an auxiliary recess disposed adjacent said upper body portion recess in said upper body portion.

24. An article conveying system comprising:
a conveyor belt including a plurality of carrier bars;
a drive mechanism for driving said conveyor belt; and
a quick-release device including a substantially continuous and non-abrasive helical spring member cooperable with each of the carrier bars and being structured to releasably snap the carrier bars onto said drive mechanism.

25. The article conveying system of claim 24, wherein said quick-release device includes a quick-release pin mounting each said helical spring member, each said helical spring member being engageable with a recess of each of said carrier bars, and wherein an ejection device is cooperable with each said quick-release pin to disengage a selected helical spring member from a respective recess.

26. A quick-release pin comprising:
an upper body portion defining longitudinal and transverse directions;
an upper body portion recess formed in and surrounding a periphery of said upper body portion; and
a flexible member positioned within and surrounding the periphery of the upper body portion recess, said flexible member having a compressed transverse dimension no greater than a transverse dimension of the upper body portion and an uncompressed transverse dimension greater than the transverse dimension of the upper body portion, wherein said flexible member includes a continuous helical spring member.

27. The quick-release pin of claim 26, further comprising a lower body portion connected to said upper body portion, said lower body port including a threaded portion.

28. The quick-release pin of claim 27, wherein said lower body portion includes a lower body recess.

29. The quick-release pin of claim 26, wherein said upper body portion includes a head portion having a top recess that is cooperable with a pin tightening device.

30. The quick-release pin of claim 29, wherein said head portion includes a beveled edge.

31. The quick-release pin of claim 29, wherein said upper body portion includes a main body having a diameter substantially equal to a diameter of the head portion.

32. A method for releasably fastening a bar-like member to a quick-release pin having a continuous helical spring member disposed thereon and surrounding a periphery of the quick-release pin, said bar-like member including at least one bar hole defining a sidewall, the sidewall having a recess surrounding a periphery of the sidewall and cooperable with the continuous helical spring member, said method comprising:
guiding the quick-release pin into the bar hole while resiliently compressing the continuous helical spring member;
sliding the quick-release pin along the bar hole until the continuous helical spring member mates with the recess; and
allowing a transverse dimension of the continuous helical spring member to resiliently expand and substantially fill the recess when the continuous helical spring member mates with the recess to create a positive lock.

33. The method of claim 32, further comprising removing the bar-like member from the quick-release pin by compressing the continuous helical spring member to eliminate said positive lock.

34. The method of claim 32, wherein the guiding step includes gradually compressing the continuous helical spring member using a truncated conical section of the bar hole.

* * * * *